US005251588A

United States Patent [19]
Tsujii et al.

[11] Patent Number: 5,251,588
[45] Date of Patent: Oct. 12, 1993

[54] CONTROLLER FOR HYBRID VEHICLE DRIVE SYSTEM

[75] Inventors: Hiroshi Tsujii; Megumu Suda, both of Susono; Yoshihide Nii, Fuji, all of Japan

[73] Assignee: Toyota Jidosha Kabushiki Kaisha, Aichi, Japan

[21] Appl. No.: 974,786

[22] Filed: Nov. 12, 1992

[30] Foreign Application Priority Data

Nov. 15, 1991 [JP] Japan .................. 3-300185

[51] Int. Cl.⁵ .............................................. F02N 17/04
[52] U.S. Cl. ...................... 123/142.5 R; 123/142.5 E
[58] Field of Search .................... 123/2, 41.01, 41.1, 123/41.31, 41.55, 142.5 R, 142.5 E; 180/65.4

[56] References Cited

U.S. PATENT DOCUMENTS 4,658,771  4/1987  Ravin ................... 123/142.5 E

FOREIGN PATENT DOCUMENTS 56-17724  4/1981  Japan .
0159909  10/1982  Japan .................... 123/142.5 R

*Primary Examiner*—Noah P. Kamen
*Attorney, Agent, or Firm*—Finnegan, Henderson, Farabow, Garrett, Dunner

[57] ABSTRACT

Disclosed is a controller mounted on a hybrid vehicle. The hybrid vehicle has a plurality of heat generating components such as an engine, and a plurality of cooling conduits through which a fluid flows for cooling said plurality of components. A controller decides whether or not the engine is in a warmed-up condition and the components whose rejected heat is utilized are in a warmed-up condition. The components whose rejected heat is utilized comprise at least one of a plurality of components mounted on the hybrid vehicle except the engine. The controller serves to form flow passages between the cooling conduit associated with the engine and the cooling conduit associated with the components whose rejected heat is utilized in the case where it is considered that the engine is not in a warmed-up condition, but the components whose rejected heat is utilized are in a warmed-up conditions.

20 Claims, 12 Drawing Sheets

CONTROLLER FOR HYBRID VEHICLE DRIVE SYSTEM

BACKGROUND OF THE INVENTION

1. Field of the Invention

The present invention relates to a hybrid vehicle (referred to as an HV) having a plurality of components such as an engine, a motor and the like, and more particularly is directed to an apparatus for promoting warm-up of the engine while cooling other components.

2. Description of the Related Arts

In a hybrid vehicle (HV) there are mounted an engine and a motor which are intended to cooperatively generate power for driving the vehicle. Among several types of HV's, there is a type called series HV (referred to as SHV hereinbelow) in which its engine, generator and motor are connected in series. In the SHV, the engine drives the generator whose output power in turn drives the motor. In the case of using a D. C. generator as the generator, a D. C. output of the generator is converted into an alternating current by means of an inverter prior to supply to the motor. In this case, a rechargeable battery may be connected between the generator and the inverter so as to store the D.C. output of the generator therein and to drive the motor with the aid of the output of the battery. Furthermore, the inverter may be controlled to derive a required output from the motor.

At the time of actuating the engine in such a vehicle, a fuel-air mixture ratio when the engine is cold is set so as to differ from that when the engine is warmed up. That is, while the engine is cold, the ratio of fuel is increased compared with the warmed-up engine. However, if actuating the engine in the cold, a larger amount of harmful materials such as CO, HC, and $NO_x$ which are contained in an exhaust gas may be produced than the engine which has been warmed up. A proper catalyst may be used to eliminate such harmful materials. In the cold, however, the temperature of the catalyst is also low. The catalyst at a relatively lower temperature generally has a poor working efficiency and adversely increases so-called emission as described hereinbefore. In addition, when the temperature of the engine is low, a lubricating oil of the engine also has a higher viscosity. If the viscosity of the lubricating oil is high, the engine itself presents a large frictional resistance, which leads to a poor fuel consumption.

A possible means of solving such problems is disclosed in Japanese Utility Model Publication No. 56-17724 in which an engine vehicle includes a heater used for warming up the engine at the time of cold start. To this end, the heater may be arranged around the engine. In this publication, a battery is provided as a power source of the heater.

Such an additional heater is applicable to the HV as well. In this case, as the HV has already been provided with the battery for the drive of the motor as described above, it may be natural to use this battery as the power source of the heater. Nevertheless, if the motor drive and the energization of the heater are carried out by the same battery, there may arise another disadvantage that the power of the battery is partly consumed due to the energization of the heater, which shortens the traveling distance per unit charge of battery.

SUMMARY OF THE INVENTION

The present invention was conceived to overcome the above problems, of which an object is to provide an apparatus capable of more efficiently promoting the warm-up of the engine without shortening the traveling distance per unit charge of battery.

A controller of the present invention is mounted on a hybrid vehicle including a plurality of heat generating components such as an engine, and a plurality of cooling conduits through which a fluid flows to cool the plurality of components. In order to achieve the above object, the controller comprises;

a) a first decision means to determine whether the engine is in a warm-up condition or not;

b) a second decision means to determine whether components whose rejected heat is utilized are in a warmed-up condition or not; the components whose rejected heat is utilized including at least one of the plurality of components to be mounted on the hybrid vehicle except the engine; and c) a control means for creating flow passages between the cooling conduit associated with the engine and the cooling conduit associated with the component whose rejected heat is utilized in the case where it is considered that the engine is not in a warm-up condition, but the component whose rejected heat is utilized is in a warm-up condition.

In the present invention, it is first decided whether the engine is in warm-up condition or not. This decision can be made by, for example, judging the temperature of the engine. More specifically, after the detection of the engine temperature by means of a sensor or the like, the first decision means judges whether the engine is in a warm-up condition or not depending on whether the detected temperature of the engine is higher than the first predetermined temperature or not.

It is then decided whether the component whose rejected heat is utilized is in a warmed-up condition or not. This decision can be made by, for example, judging the temperature of the component whose rejected heat is utilized. More specifically, after the detection of the temperature of the component whose exhaust heat is utilized, the second decision means judges whether the components whose rejected heat is utilized are in a warmed-up condition or not depending on whether the detected temperature of the component whose rejected heat is utilized is higher than the temperature of the second predetermined temperature.

As a result of these decision, if it is considered that the engine is not in a warmed-up condition, but the component whose rejected heat is utilized is in a warmed-up condition, then flow passages between the cooling conduit associated with the engine and the cooling conduit associated with the component whose rejected heat is utilized are opened by the control means. Providing that the hybrid vehicle includes a predetermined number of valves adapted to open the flow passages between the cooling conduit associated with the engine and the cooling conduit associated with the component whose rejected heat is utilized in compliance with a signal, the control means serves to form flow passages between the cooling conduit associated with the engine and the cooling conduit associated with the component whose rejected heat is utilized by way of the valve control.

When there are established flow passages between the cooling conduit associated with the engine and the cooling conduit associated with the component whose rejected heat is utilized, the fluid which has been warmed up is allowed to pass through the cooling conduit associated with the engine, to thereby warm up the engine. Therefore, when the engine is cold, it can be warmed up by the rejected heat of these components.

In this manner, when the engine is cold, the present invention promotes the warm-up of the engine by the user of the rejected heat of the other components, thereby realizing a prompt warm-up of the engine without shortening the traveling distance per unit charge of battery and improving the emission at the time of cold start. It is to be appreciated that the flow passages may be blocked after the warm-up of the engine to separately execute the cooling of the components.

DESCRIPTION OF THE PREFERRED EMBODIMENTS

A presently preferred embodiment of the present invention will now be described with reference to the accompanying drawings.

Figure 1:
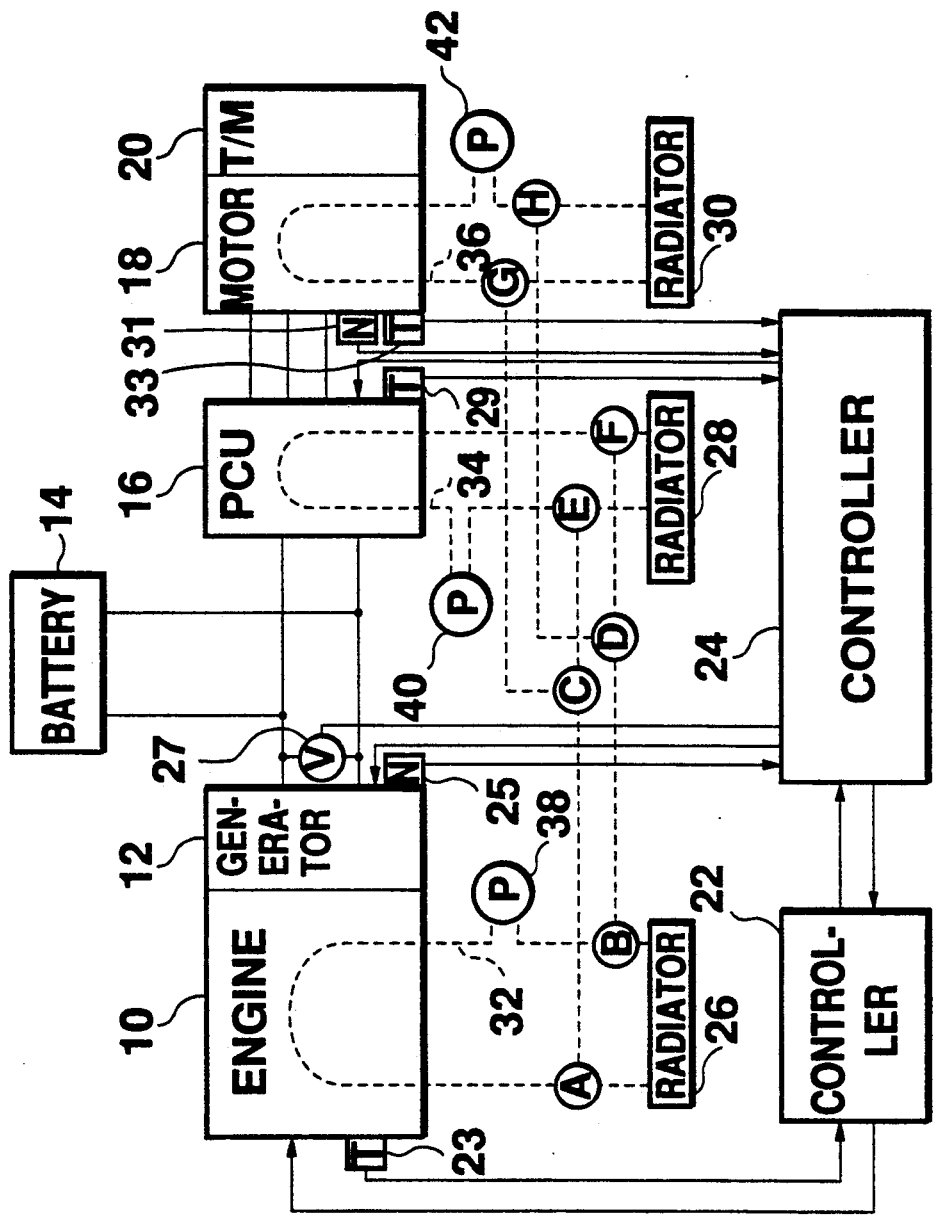
FIG. 1 is a block diagram showing a configuration of an HV drive system controller in accordance with a first embodiment of the present invention.

FIG. 1 shows a configuration of a controller for HV (hybrid vehicle) drive system in accordance with a first embodiment of the present invention. Shown in this figure is a configuration of the present invention, by way of example, incorporated into an SHV (series hybrid vehicle). The present embodiment comprises an engine 10; a generator 12 driven by the engine 10 and producing a DC power; a battery 14 which is capable of being charged and discharged; a power controller unit (referred to as PCU hereinafter) 16 including therein an inverter circuit for receiving an output from the generator 12 or the battery 14 to convert into a three-phase alternating current for output; and a motor 18 driven by the output of the PCU 16. The motor 18 is drivingly linked to wheels not shown by way of a transmission 20 and the like.

This embodiment further comprises a pair of controllers 22 and 24. In particular, the controller 22 intends to control the amount of fuel injection or the like in the engine 10. The control is performed by use of information on temperature of the engine 10 from a sensor 23 arranged on the engine 10.

On the contrary, the controller 24 intends to control, in particular, the generator 12 and PCU 16. The controller 24 receives information on the revolving speed of the generator 12 and on the output voltage of the generator 12, respectively, from a sensor 25 and a sensor 27, while issuing an exciting instruction to the generator 12. The controller 24 further receives information on the temperature of the PCU 16 and on the revolving speed of the motor 18, respectively, from a sensor 29 provided on the PCU 16 and a sensor 31 provided on the motor 18. Naturally, the controller 24 may accept other information. The controller 24 further sends forth a PWM (pulse width modulated) signal to the PCU 16, thereby performing vector control of the current to be supplied to the motor 18. The controllers 22 and 24 interchange desired information such as the temperature of the engine 10.

The engine 10, PCU 16 and motor 18 are components which generate a heat to some extent when in operation. This embodiment is therefore provided with three radiators 26, 28 and 30 so as to cool the engine 10, PCU 16 and motor 18, respectively. A way of cooling is a water cooled method in which cooling ducts are arranged as shown by broken lines in FIG. 1. A cooling conduit 32 associated with the engine 10, a cooling conduit 34 associated with the PCU 16, and a cooling conduit 36 associated with the motor 18 are provided with pumps 38, 40 and 42, respectively. These pumps 38, 40 and 42 aid water in flowing between their respective cooling ducts and the corresponding radiators. Under the control of the controller 24, the pumps 38, 40 and 42 are actuated, stopped or pressure regulated.

Figure 2:
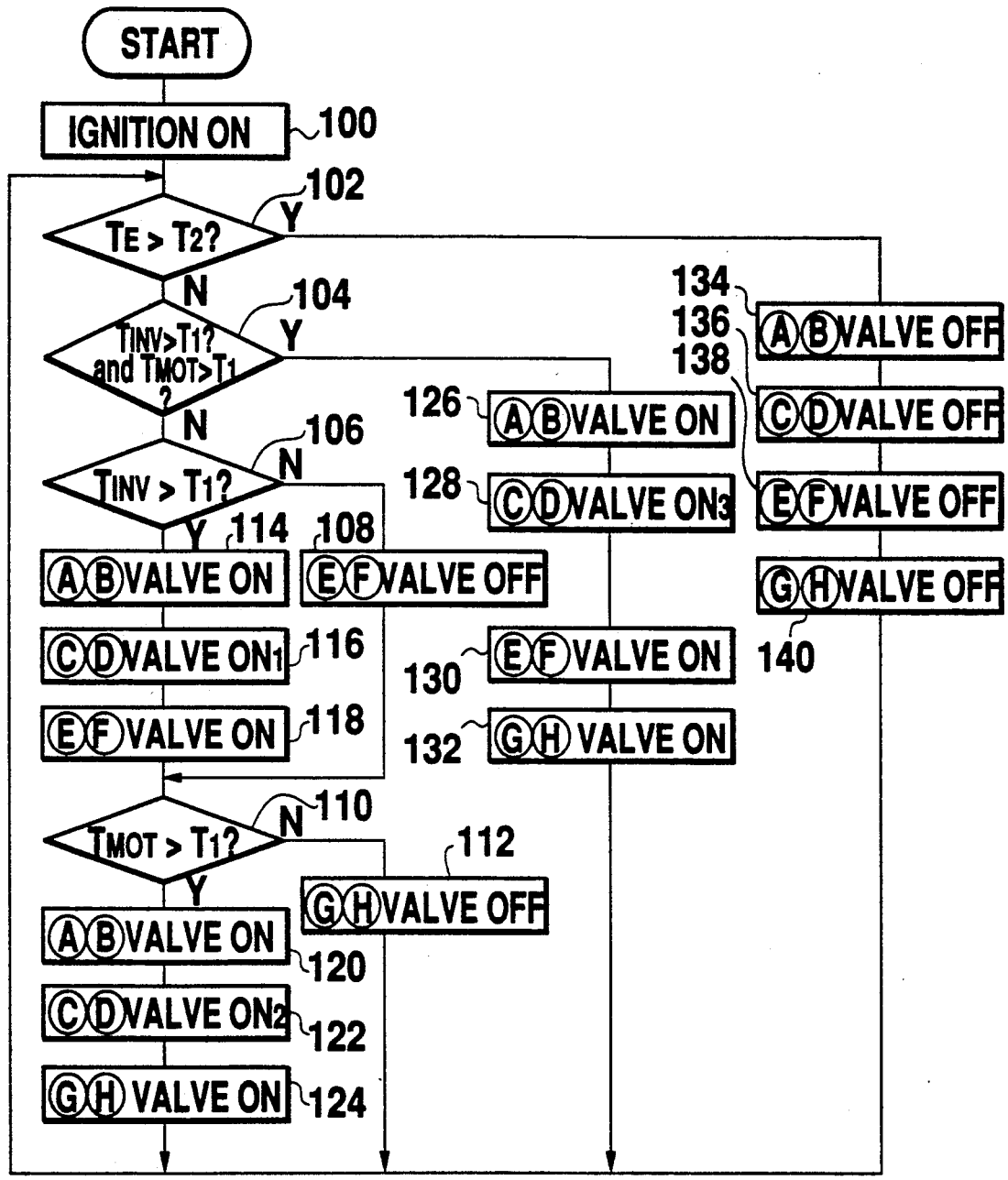
FIG. 2 is a flowchart showing a valve control action of the first embodiment in FIG. 1.

This embodiment is characterized firstly in that the cooling ducts 32, 34 and 36 are interconnected by way of valves A through H, and secondly in that the controller 24 controls the valves A through H to correspondingly open or close fluid channels extending between the cooling ducts 32, 34 and 36 if desired. FIG. 2 diagramatically shows a flow of valve control processing in this embodiment.

First of all, an ignition switch which is not shown is turned on (100), and then the controllers 22 and 24 decide whether the temperature $T_E$ of the engine 10 exceeds a predetermined temperature $T_2$ (e.g., 80° C.) (102). This step 102 is a step for judging whether the engine 10 is sufficiently warmed up or not. At the time of cold start, the engine remains cool immediately after the ignition switch has been turned on, and hence the condition of the step 102 is not satisfied. In this case, the procedure advances to next step 104.

At step 104, it is decided whether or not a temperature $T_{INV}$ of the PCU 16 and a temperature $T_{MOT}$ of the motor 18 both exceed a predetermined temperature $T_1$ (e.g., 80° C.). This is made for the purpose of judging whether both the PCU 16 and motor 18 are sufficiently warmed up. At cold start, this condition is not satisfied either, and accordingly the advance to step 106 is permitted.

At step 106, it is decided whether the temperature $T_{INV}$ of the PCU 16 is higher than the predetermined temperature $T_1$ or not. As in the case of steps 102 and 104, the CPU 16 has not sufficiently warmed up at this point in time from the cold start. Hence, the condition of the step 106 is not satisfied and the procedure advances to step 108. At step 108, the valves E and F provided on the cooling conduit 34 associated with the PCU 16 are turned off. As a result, the cooling conduit 34 associated with the PCU 16 is connected with the radiator 28, and the water is not allowed to flow from the valves E and F toward the valves C and D.

Afterwards, step 110 is executed where it is judged whether the temperature $T_{MOT}$ of the motor 18 exceeds the predetermined temperature $T_1$. Since this condition is not satisfied at the time of cold start, step 112 is carried out after the step 110. At the step 112, the valves G and H provided on the cooling conduit 36 associated with the motor 18 are turned off. As a result, the cooling conduit 36 is connected to the radiator 30, and the water is not allowed to flow toward the valves C and D. Afterwards, the procedure returns to step 102.

In this state, the cooling ducts 32, 34 and 36 are isolated from one another. Subsequently, the same procedure is repeated until either the PCU 16 or the motor 18 is sufficiently warmed up to exceed the predetermined temperature $T_1$. The PCU (inverter) 16 normally has a tendency to be warmed up sooner than the motor 18, and accordingly the condition of the step 106 will be satisfied previous to that of the step 110. When the condition of the step 106 is established, the valves A to F are turned on (114 to 118), thus resulting in the formation of flow passages between the cooling conduit 32 associated with the engine 10 and the cooling conduit 34 associated with the PCU 16 by way of the valves A to F. Then the water within the cooling conduit 34 warmed up by the PCU 16 is allowed to flow into the cooling conduit 32 associated with the engine 10. In this state, the engine 10 is warmed up by the rejected heat of the PCU 16.

While on the contrary, when the motor 18 is warmed up earlier than the PCU 16, in other words, the condition of the step 110 is satisfied previous to that of the step 106, the valves A to D, G and H are turned on (120 to 124). In this case, these are formed fluid passages between the cooling conduit 32 associated with the engine 10 and the cooling conduit 36 associated with the motor 18. Under these circumferences, the engine 10 is warmed up by the exhaust heat of the motor 18.

After either the PCU 16 or the motor 18 has been sufficiently warmed up (in other words, the condition of either the step 106 or step 110 is satisfied), further sufficient warm-up of the remaining component establishes the condition of the step 104 to turn on the valves A to H (126 to 132). This brings about a formation of fluid passages among the cooling conduit 32 associated with the engine 10, the cooling conduit 34 associated with the PCU 16, and the cooling conduit 36 associated with the motor 18. Under these circumstances, the engine 10 is warmed up by the rejected heat of both the PCU 16 and the motor 18.

When the engine 10 is sufficiently warmed up, that is, the temperature $T_E$ of the engine 10 exceeds the predetermined temperature $T_2$, steps 134 to 140 are executed where the valves A to H are all turned off. In other words, the fluid passages between the cooling conduits 32, 34 and 36 are all closed, and the engine 10, PCU 16 and motor 18 are cooled down by the radiators 26, 28 and 30, respectively.

Figure 3A:
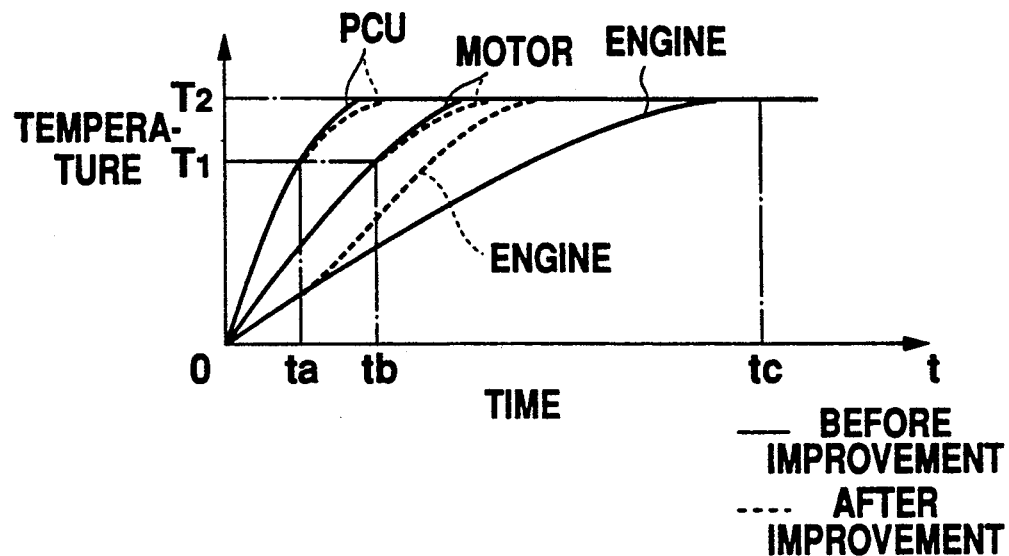
FIGS. 3A and 3B depict a temperature rise curve in the first embodiment in FIG. 1, and an effect of improved emission and fuel consumption, respectively.
Figure 3B:
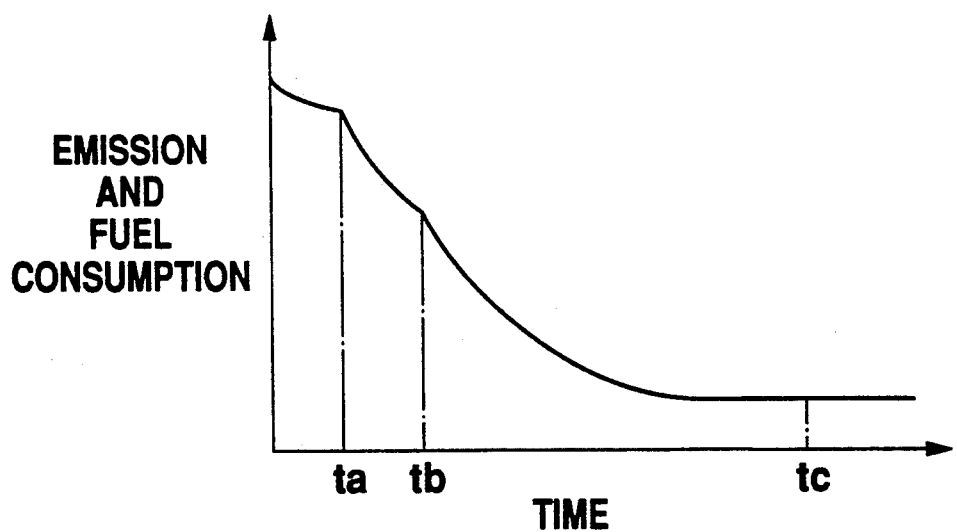

FIGS. 3A and 3B depict the function and effect of this embodiment. FIG. 3A represents that the temperature of the engine 10 is sharply raised in the case where a valve control illustrated in FIG. 2 is carried out (shown by a broken line) as compared with the absence of the valve control (shown by a solid line), which means that the engine 10 is effectively warmed up by rejected heat of the PCU 16 and/or the motor 18. In addition, FIG. 3B represents that the emission and fuel consumption are progressively decreased as the rejected heat of the PCU 16 and motor 18 is utilized for warming up the engine 10, which means that this embodiment provides measures of promptly improving the poor emission and fuel consumption immediately after turn-on of the ignition switch.

In the HV, the motor 18 can be driven by the use of output of the battery 14 with the engine 10 at rest or idling. Accordingly, the following control can be made in cooperation with the valve control action of this embodiment.

The motor 18 is first actuated only by the use of the battery 14 with the ignition switch on, the engine 10 remaining at rest. After the progress of warming-up of the engine 10 through the action shown in FIG. 2, for example, by the rejected heat of the PCU 16, the engine 10 is started and the output of the generator 12 is produced, which ensures a remarkably effective reduction in the emission.

It is to be appreciated that the control action described above is appropriately shared between the controllers 22 and 24.

Figure 4:
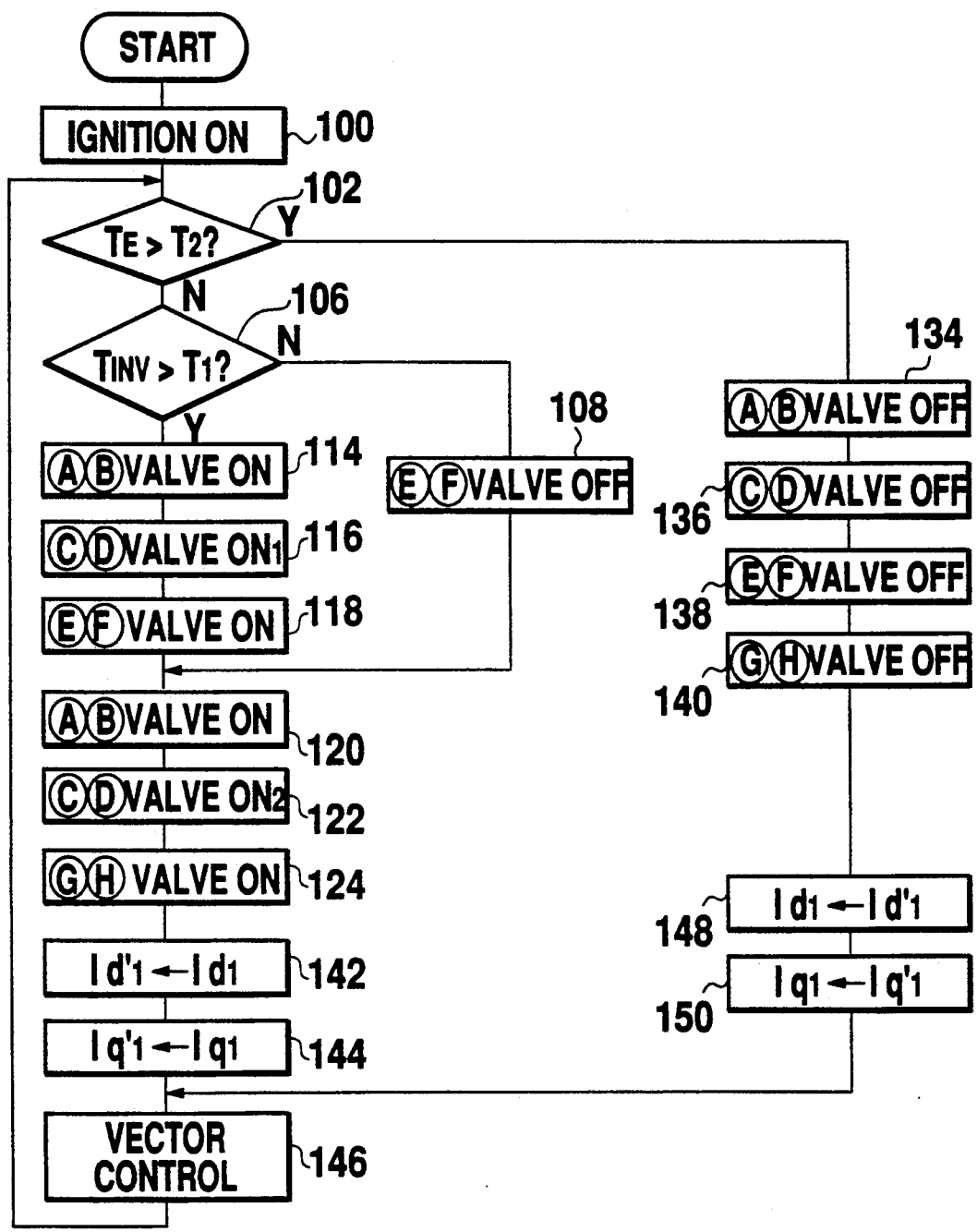
FIG. 4 is a flowchart showing the flow of a valve control of the HV drive system controller in accordance with a second embodiment of the present invention as well as a heat generation control action.

FIG. 4 shows the action of a valve control and power generation control of a system in accordance with a second embodiment of the present invention. The system of this embodiment is generally configured in substantially the same manner as in the first embodiment shown in FIG. 1, except the control action of the controllers 22 and 24. This embodiment is characterized in that the heat generation of the motor 18 is intentionally increased by a vector control on the PCU 16 so as to warm up the engine 10 more sufficiently by the heat of the motor 18.

As is clear from FIG. 4, immediately after the ignition switch is turned on (100), it is decided whether a temperature $T_E$ of the engine 10 exceeds a predetermined temperature $T_2$ (102). At the time of cold start, this condition is not established, which allows advance to step 106. It is judged at the step 106 whether a temperature $T_{INV}$ of the PCU 16 exceeds a predetermined temperature $T_1$. At the cold start, this condition is not satisfied, and accordingly the procedure advances to step 108 in the same manner as the first embodiment.

In the case of this embodiment, steps 120 to 124 are carried out soon after the execution of the step 108. That is, water passages are formed between the cooling conduit 36 associated with the motor 18 and the cooling conduit 32 associated with the engine 10. Moreover, an exciting current of the motor is set to $I_{d1'}$ (142), and a torque current is set to $I_{q1'}$ (144). Afterwards, the PCU 16 undergoes a vector control based on the exciting current $I_{d1'}$ and the torque current $I_{q1'}$ which have been set (146), and the procedure returns to step 102.

Subsequently, at the time when the temperature $T_{INV}$ of the PCU 16 exceeds the predetermined temperature $T_1$, steps 114 to 118 are executed. Furthermore, when the condition of the step 102 is satisfied, and accordingly when the engine 10 is considered to have been sufficiently warmed up, steps 134 to 140 are executed. In consequence, the exciting current and the torque current are set to $I_{d1}$ and $I_{q1}$, respectively (148, 150) followed by the execution of the vector control (146).

Figure 5A:
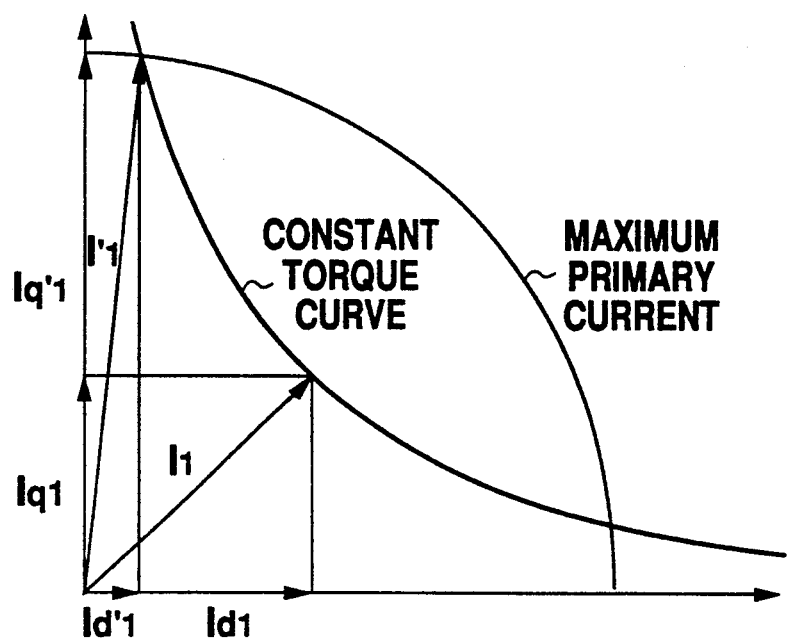
FIGS. 5A and 5B depict the relationship between an exciting current and a torque current in the second embodiment in FIG. 4, and the relationship between the torque current and the heat generation of the motor, respectively.

The relationship between the exciting current and torque currents to be set at steps 142, 144, 148 and 150 is shown, by way of example, in FIG. 5A. In order to keep the output torque of the motor 18 constant, the torque current and the exciting current must be set so as to lie on a line represented as a constant torque curve in the figure. On the other hand, the torque current must be minimized so as to lessen the slip of the motor 18. In order to ensure a constant output torque and a minimum slip, a torque current represented as $I_{q1}$ in the figure is requested. Correspondingly, the exciting current is represented as $I_{d1}$ with a primary current $I_1$. On the contrary, to maximize the slip of the motor 18 with constant output torque, a primary current $I_{q1'}$ and accordingly a torque current must be so set as to lie on an intersection between the constant torque curve and an arc representing a maximum primary current in FIG. 5A. The exciting torque $I_{d1'}$ is a value of the exciting torque corresponding to this torque current $I_{q1'}$.

Figure 5B:
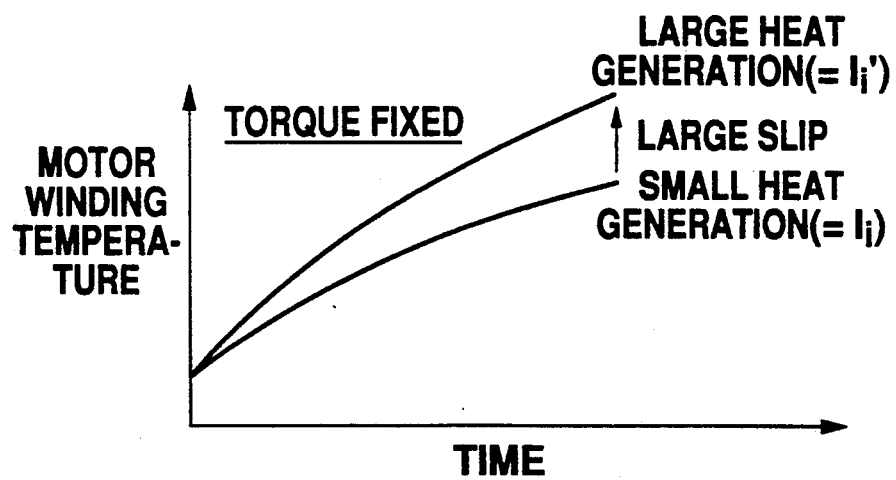

Consequently, through the setting such as steps 142 and 144 and vector control 146 of the primary current value of the motor 18, there can be obtained an action of the motor 18 having a maximum slip and a greater heat generation as shown by the upper curve in FIG. 5B. On the contrary, through the setting of the torque current and the exciting current as defined in steps 148 and 150 and vector control 146, there can be obtained an effective action having a minimum slip and a smaller heat generation which is represented by the lower curve in FIG. 5B. In other words, the motor 18 is actuated with a larger slip and a larger heat generation due to primary copper loss under the condition where the engine 10 has not been sufficiently warmed up, while the motor 18 is actuated with normal operational condition, that is, with a smaller slip and a smaller heat generation under the condition where the engine 10 has been sufficiently warmed up. Therefore, this embodiment employs an intentionally increased heat generation of the motor 18 only while the engine 10 is cold, thereby ensuring an effective warm-up of the engine 10.

Figure 6:
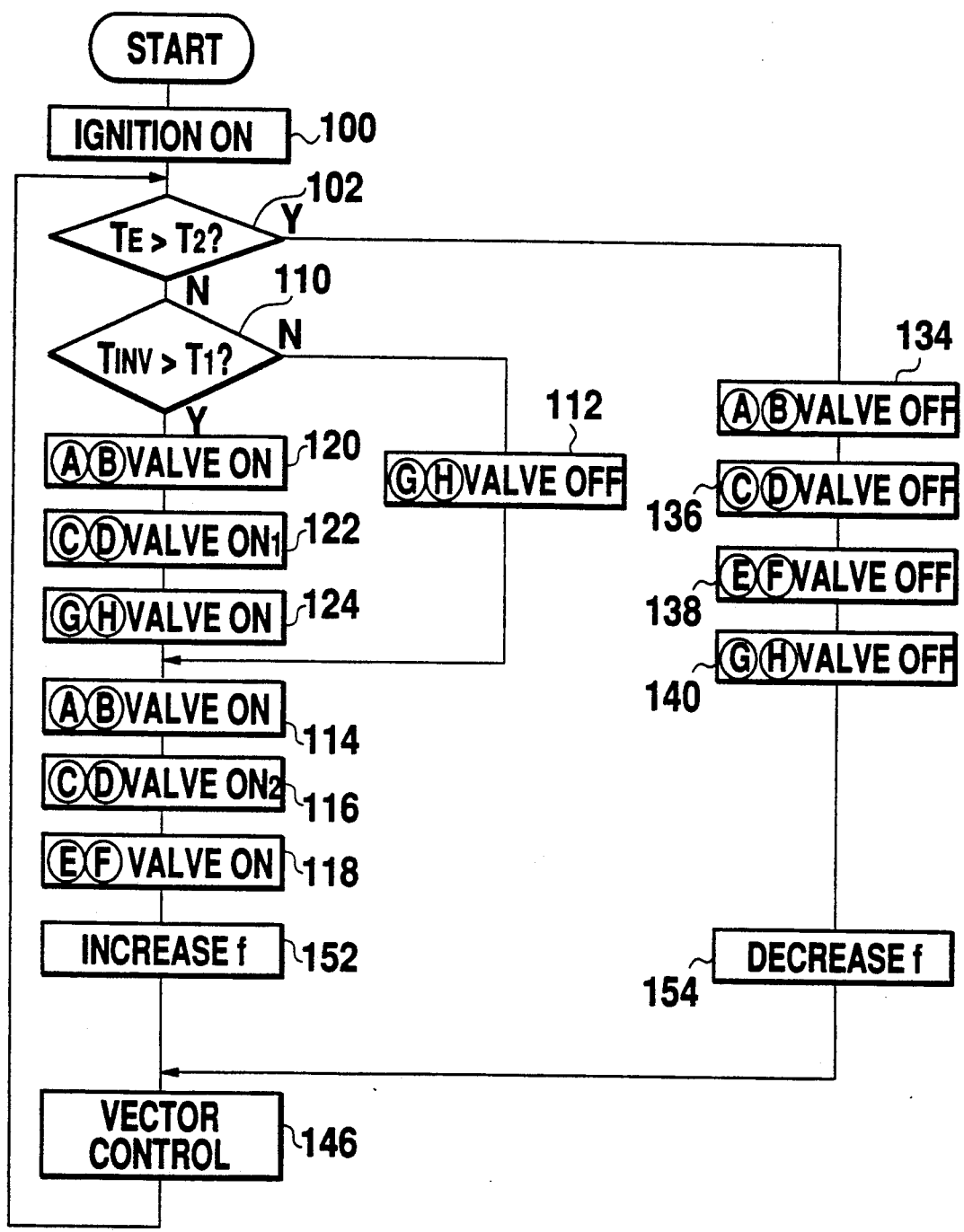
FIG. 6 is a flowchart showing a flow of a valve control in the HV drive system controller in accordance with a third embodiment of the present invention, and the heat generation control action.

FIG. 6 shows an action of a valve control and a power generation control of a system in accordance with the third embodiment of the present invention. The system of this embodiment is also configured in the same manner as the first embodiment shown in FIG. 1. In this embodiment, the heat generation of the motor 18 is not intentionally increased, but instead the heat generation of the PCU 16 is intentionally increased.

More specifically, this embodiment carries out step 110 immediately after step 102, and then either of step 112 or steps 120 to 124 is selectively carried out based on the result of decision. After the step 112 or steps 120 to 124 steps 114 to 118 are carried out. After the execution of the step 118, a switching frequency f associated with the PCU 16 is set higher than the ordinary operational condition (152), and then the procedure advances to a vector control 144. Providing that the engine 10 has been sufficiently warmed up and the criterion of the step 102 is satisfied, the frequency f is returned to an ordinary value (154) after the execution of the valve control action at steps 134 to 140.

This control depends on the fact that the heat generation of the PCU 16 which includes an inverter is decided by the switching frequency f associated with the PWM control. More specifically, the higher the switching frequency f associated with the PWM control, the larger the heat generation of the PCU 16 is, and vice versa. Accordingly, in this embodiment, the heat generation of the PCU 16 is intentionally increased to accelerate the warm-up of the motor 10. When the motor 10 is fully warmed up, the PCU 16 returns to the ordinary action.

Figure 7:
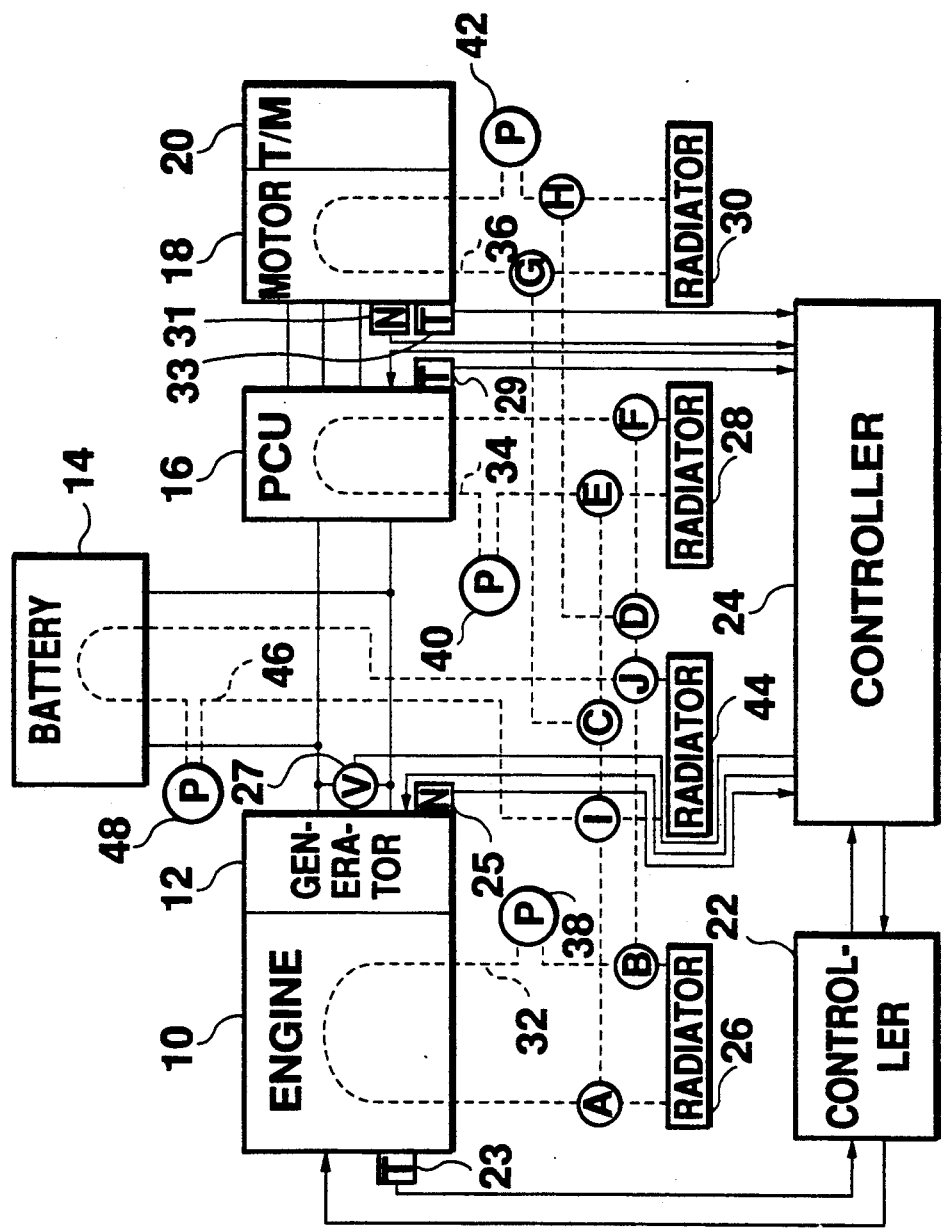
FIG. 7 is a block diagram showing a configuration of the HV drive system controller in accordance with a fourth embodiment of the present invention.

FIG. 7 depicts a configuration of a system in accordance with a fourth embodiment of the present invention. This embodiment differs from the foregoing embodiments in the provision of members corresponding to the battery 14 such as a radiator 44, a cooling conduit 46, a pump 48 and valves I and J.

Figure 8:
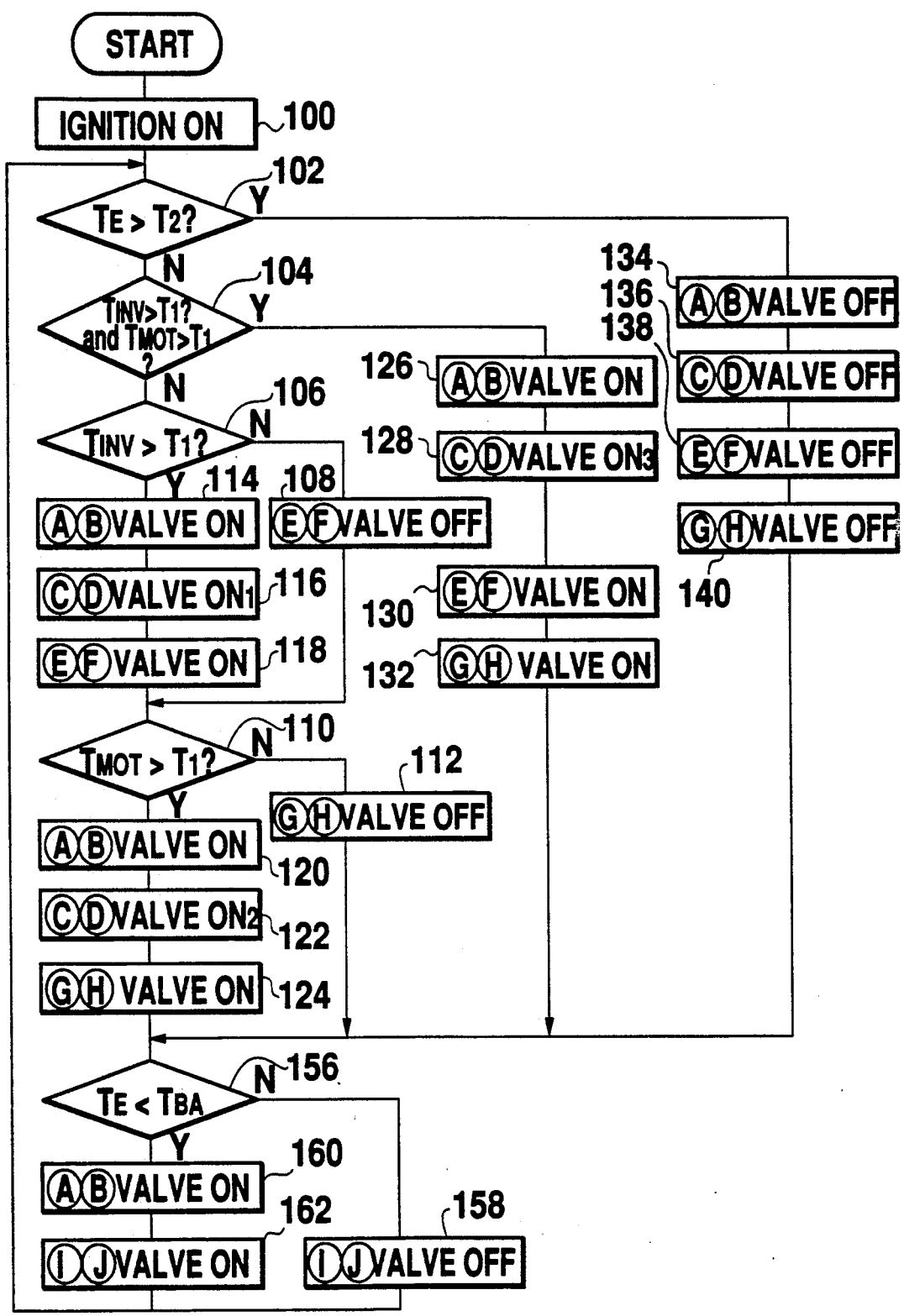
FIG. 8 is a flowchart showing a flow of a valve control action in the fourth embodiment in FIG. 7.

FIG. 8 diagramatically shows the processing flow of the valve control action of the controller 24 in this embodiment.

The action illustrated in this figure is different from the action of the first embodiment in that steps 156 to 162 are carried out after the execution of steps 112, 124, 132 and 140. It is decided at step 156 whether a temperature $T_E$ of the engine 10 is lower than a temperature $T_{BA}$ of the battery 14, and unless this condition is satisfied, the valves I and J provided on the cooling conduit 46 are turned off (158). The valves I and J are arranged between the valves A and C, and between the valves B and D, respectively. With these valves off, the cooling conduit 46 is connected with the radiator 44 to form no flow passage directed toward the valves A to D. That is, if the condition of the step 156 is not satisfied, the rejected heat of the battery 14 does not contribute to the warm-up of the engine 10.

Provided that the condition of the step 156 is satisfied, the valves A, B, I and J are all turned to on (160, 162). With these valves on, water passages are formed between the cooling conduit 46 associated with the battery 14 and the cooling conduit 32 associated with the engine 10, which allows water warmed by the rejected heat of the battery 14 to flow into the cooling conduit 32 associated with the engine 10. The engine 10 is thus warmed up by virtue of the rejected heat of the battery 14. According to the present embodiment in this manner, the rejected heat of the battery 14 is also utilized to warm up the engine 10, thereby remarkably promoting the warm-up of the engine 10.

In lieu of the steps 156 to 162 in FIG. 8, the following processing, for example, may be carried out. More specifically, the criterion of the step 104 is replaced by $T_{INV} > T_1$ and $T_{MOT} > T_1$ and $T_{BA} > T_1$, using nesting similar to the steps 106, 108, and 114 to 118. For such a control procedure, the procedure shown in FIG. 8 is advantageous when the battery 14 produces less heat than the PCU 16 and the motor 18.

Figure 9:
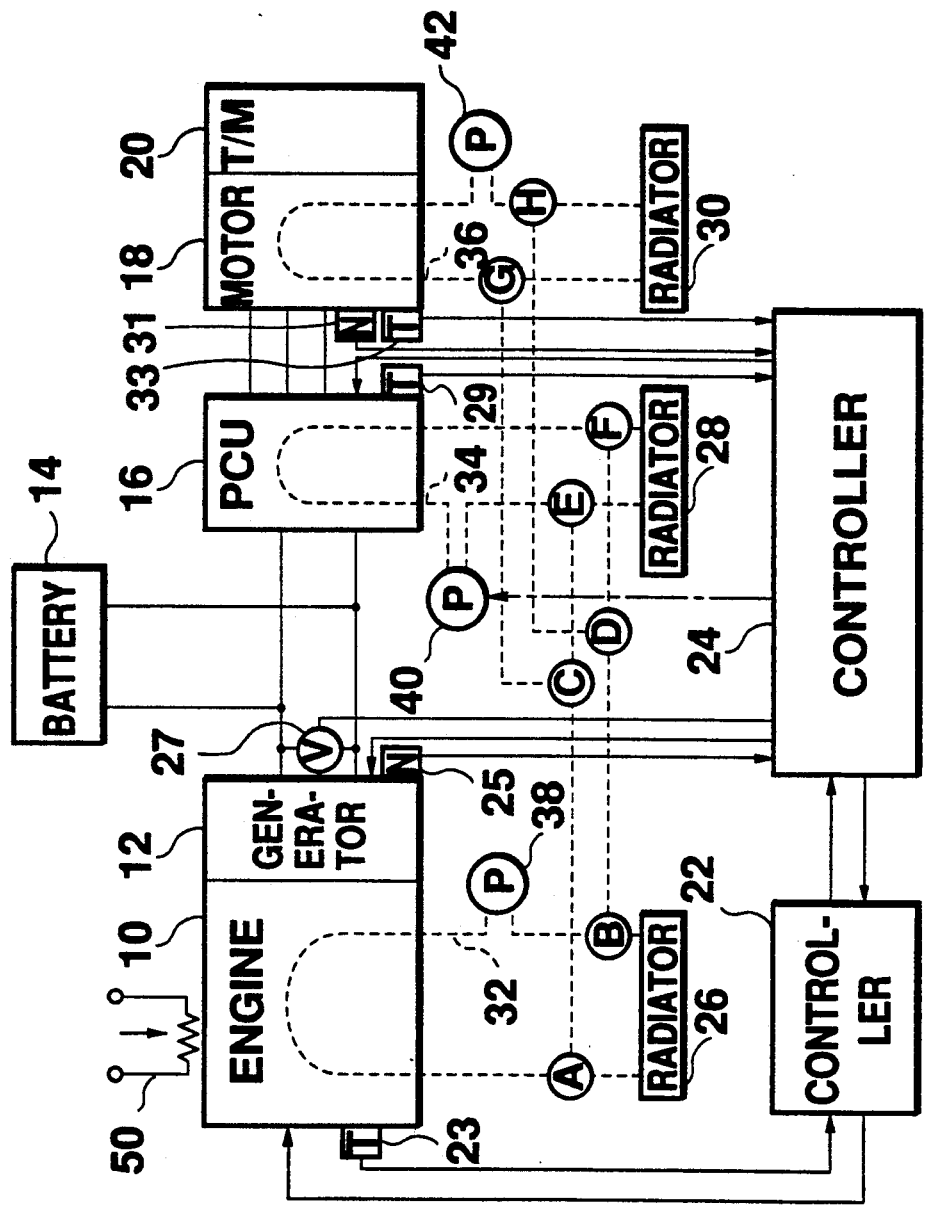
FIG. 9 is a block diagram showing a configuration of the HV drive system controller in accordance with a fifth embodiment of the present invention.

FIG. 9 diagramatically shows a configuration of a system in accordance with a fifth embodiment of the present invention. This embodiment shown in FIG. 9 differs from the first embodiment in the provision of a heater 50 to assist in the warm-up of the engine 10. In this embodiment, the heater 50 is supplimentarily used to accelerate the warm-up of the engine 10 in addition to the exhaust heat of the PCU 16 and the motor 18.

Figure 10:
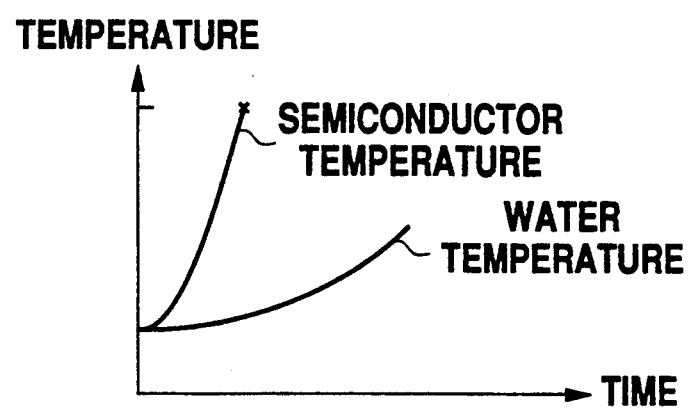
FIG. 10 depicts the relationship between the temperature of semiconductor and the water temperature in a power controller unit.

It is to be noted that the PCU 16 includes a variety of semiconductors such as switching transistors. Consequently, the PCU 16 has a small heat capacity and is liable to sharply rise in temperature due to a load such as the motor 18 (refer to FIG. 10). It is therefore difficult to perform satisfactory cooling merely by water cooling with the aid of the cooling conduit 34. Up to now, in order to eliminate or reduce such disadvantages, a thick aluminum plate has been used to increase the heat capacity, or the pump 40 was rotated at all times. However, the addition of the aluminum plate and the like inconveniently leads to an increase in weight and cost, and further to a reduction in radiation properties due to a poor heat transfer. Moreover, the rotation of the pump 40 at all times increases the power consumption.

It is therefore conceivable to put the pump 40 under the control of the controller 24 as shown by a long and short dash line in FIG. 9 so as to switch the status of the pump 40 in response to the output status of the PCU 16.

Figure 11A:
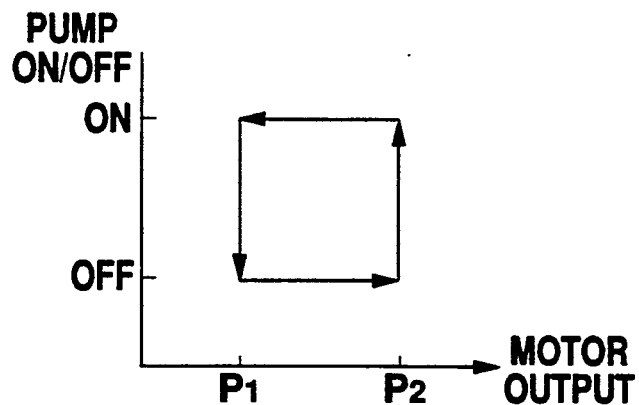
FIGS. 11A and 11B both show an action of the HV drive system controller in accordance with a sixth embodiment of the present invention, FIG. 11A illustrating the relationship between ON/OFF of a pump and a motor output instruction, and FIG. 11B illustrating a flow of on-off control of the pump.
Figure 11B:
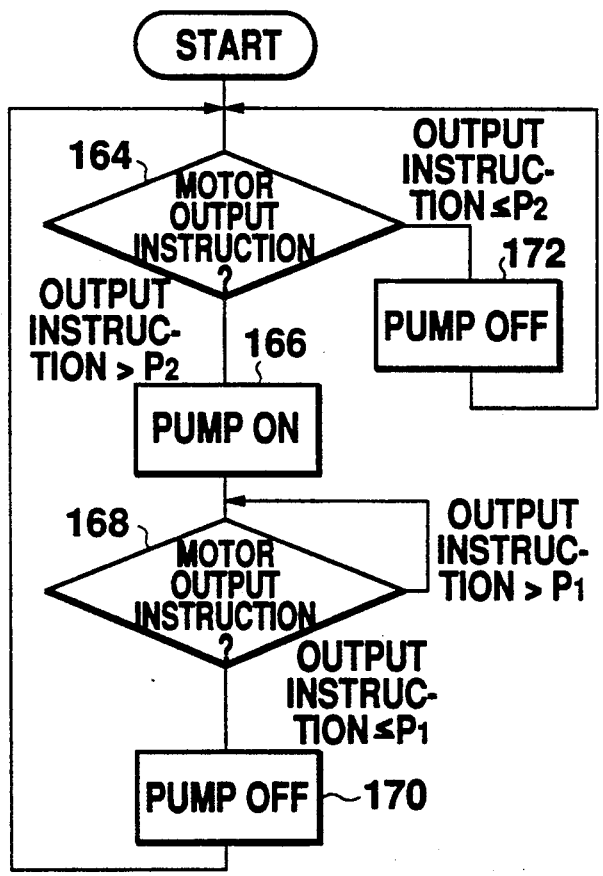

FIGS. 11A and 11B show an action of the control over the pump 40 in the form of an ON/OFF control.

The pump control action of this embodiment or a sixth embodiment of the present invention is as follows The controller 24 decides whether an output instruction to the motor 18 exceeds a predetermined value $P_2$ or not (164). When this condition is satisfied, the PCU 16 activates the pump 40 (166). It is then judged whether the output instruction to the motor 18 is not more than $P_1$ (168). The pump 40 remains on until this condition is satisfied. The pump 40 is deenergized when this condition is established (170). Subsequently, the procedure returns to step 164. On the contrary, the pump 40 is turned off (172) from when it is judged that the output instruction to the motor 18 is smaller than $P_2$ (164).

Accordingly, this embodiment permits the pump 40 to be turned on only in the case of larger output instruction to the motor 18 (than $P_2$), thereby presenting water circulation within the cooling conduit 34 associated with the motor 18. Hence, the relationship between ON/OFF of the pump 40 and the motor output instruction is provided as shown in FIG. 11A.

Figure 12:
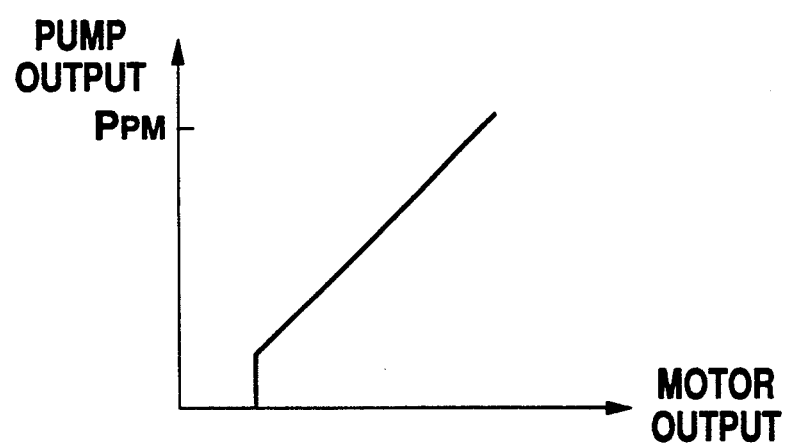
FIG. 12 shows a control curve of the pump in the HV drive system controller in accordance with a seventh embodiment of the present invention.

FIG. 12 further shows an action of on-off control of this embodiment in the form of a continuous-variation control. In this embodiment i.e. a seventh embodiment, the output of the pump 40 is gradually decreased responsive to the output instruction to the motor 18 rising. This also ensures a suitable quantity of water for cooling the PCU 16 while restraining power consumption, in the same manner as the sixth embodiment.

It is desirable that these actions described as the sixth and seventh embodiments be incorporated into the first to fifth embodiments, thereby utilizing the rejected heat for warming up the engine 10 while preferably cooling the PCU 16.

It is to be understood that the valve control described hereinbefore is not exclusively confined to the application to warm-up of the engine 10. For example, in case where the vehicle is used in a cold area and the engine 10 is sufficiently warmed up and the other components are cold, the rejected heat of the engine 10 can be utilized for the warm-up of the other components.

According to the present invention as detailed hereinabove, the engine is warmed up by making use of rejected heat of components such as the motor, thus realizing a prompt warm-up of the engine without shortening the traveling distance per charge of the battery, to consequently improve the emission at the time of cold start.

What is claimed is:

1. A controller mounted on a hybrid vehicle having a plurality of heat generating components including an engine, each of said plurality of heat generating components including a cooling conduit through which a fluid flows to cool the respective components, the cooling conduits of said plurality of heat generating components being selectively interconnected, said controller comprising:

first decision means for deciding whether said engine is in a warmed-up condition;

second decision means for deciding whether components whose rejected heat is to be utilized are in a warmed-up condition, said components whose rejected heat is to be utilized including at least one of said plurality of heat generating components to be mounted on the hybrid vehicle except said engine; and control means for allowing the fluid to flow between the cooling conduit of said engine and the cooling conduit of the component whose rejected heat is to be utilized when said first decision means determines that said engine is not in a warmed-up condition and said second decision means determines that the component whose rejected heat is to be utilized is in a warmed-up condition.

2. A controller according to claim 1, further comprising means for detecting the temperature of said engine,
   wherein said first decision means decides whether said engine is in a warmed-up condition based on whether the detected temperature of said engine is higher than a first predetermined temperature.

3. A controller according to claim 1, further comprising means for detecting the temperature of the component whose rejected heat is to be utilized,
   wherein said second decision means decides whether the component whose rejected heat is to be utilized is in a warmed-up condition based on whether the detected temperature of the component whose rejected heat is to be utilized is higher than a second predetermined temperature.

4. A controller according to claim 1,
   wherein said hybrid vehicle has a predetermined number of valves which, in response to a signal, open flow passages between said cooling conduit of said engine and the cooling conduit of the component whose rejected heat is to be utilized, and
   wherein said control means allows fluid to flow between the cooling conduit of said engine and the cooling conduit of the component whose rejected heat is to be utilized by way of a valve control.

5. A controller according to claim 1,
   wherein said control means blocks the flow of fluid between said cooling conduit of said engine and said cooling conduit of the component whose rejected heat is to be utilized when said first decision means determines that said engine is in a warmed-up condition.

6. A controller according to claim 1,
   wherein said hybrid vehicle has a plurality of radiators corresponding to said plurality of heat generating components, and wherein
   said plurality of heat generating components are connected with the corresponding radiators by way of the respective cooling conduits.

7. A controller according to claim 1, wherein said hybrid vehicle has a pump provided on each of said cooling conduits.

8. A controller according to claim 1, wherein said hybrid vehicle has a motor which provides a power driving said hybrid vehicle and which serves as the component whose rejected heat is to be utilized.

9. A controller according to claim 1, wherein said hybrid vehicle has a power controller unit which controls the power driving said hybrid vehicle and which serves as the component whose rejected heat is to be utilized.

10. A controller according to claim 1, wherein said hybrid vehicle has a battery which stores an electric power used for driving said hybrid vehicle and which serves as the component whose rejected heat is to be utilized.

11. A controller according to claim 1, wherein said hybrid vehicle has components consisting of:
   said engine;
   a generator which generates electric power in response to a mechanical output of said engine; and
   a motor which is driven in compliance with the output power of said generator and provides a power for driving said hybrid vehicle.

12. A controller according to claim 11,
   wherein said generator is a D. C. generator which produces D. C. power, and
   wherein said hybrid vehicle has a power controller unit which converts the D. C. power from said D. C. generator into an A. C. power having a value corresponding to the desired driving power for supply to said motor.

13. A controller according to claim 12,
   wherein said hybrid vehicle includes a battery which stores the output power of said D. C. generator for supply to said power controller unit.

14. A controller according to claim 1,
   wherein a plurality of components whose rejected heat is to be utilized are provided,
   wherein said second decision means executes said decision with respect to each of said plurality of components whose rejected heat to be is utilized, and
   wherein said control means allows fluid to flow between said cooling conduit of said engine and said cooling conduit of the components whose rejected heat is to be utilized when said first decision means determines that said engine is not in a warmed-up condition and said second decision means determines that at least one of the components whose rejected heat is to be utilized is in a warmed-up condition.

15. A controller according to claim 1, further comprising rejected heat enhancement means for compulsorily enhancing the rejected heat of the components whose rejected heat is to be utilized when said first decision means determines that said engine is not in a warmed-up condition and said second decision means determines that the component whose rejected heat is to be utilized is in a warmed-up condition.

16. A controller according to claim 15,
   wherein said hybrid vehicle has components at least consisting of:
   said engine;
   a motor which receives electric power and provides power for driving said hybrid vehicle and which serves as the component whose rejected heat is to be utilized; and
   a power controller unit which controls the electric power to be supplied into said motor,
   wherein said rejected heat enhancement means issues an instruction to raise the temperature of said motor to said power controller unit when said first decision means determines that said engine is not in a warmed-up condition and said second decision means determines that the component whose rejected heat is to be utilized is in a warmed-up condition, and
   wherein said power controller unit controls the electric power to be supplied into said motor in response to said instruction to raise the temperature of said motor.

17. A controller according to claim 16, wherein
   said power controller unit vector-controls the current to be supplied into said motor in response to said instruction to raise the temperature of said motor.

18. A controller according to claim 15, wherein
   said hybrid vehicle has components at lest consisting of:
   said engine: and
   a power controller unit which serves as the component whose rejected heat is to be utilized and which controls a power for driving said vehicle in compliance with the control signal having a predetermined frequency, and which changes the amount of the heat to be generated in compliance with the change in the frequency of the control signal;
   said rejected heat enhancement means changes the frequency of said control signal when said first decision means determines that said engine is not in a warmed-up condition and said second decision means determines that the component whose rejected heat is to be utilized is in a warmed-up condition, thereby raising the temperature of said power controller unit.

19. A controller according to claim 1, further comprising a heater to supplimentarily warm up said engine.

20. A controller according to claim 1, wherein
   said hybrid vehicle has pumps arranged on said cooling conduits of said plurality of heat generating components intended to generate or control the driving power of the vehicle, and
   wherein said controller includes means for controlling the cooling of said plurality of heat generating components by controlling said pump in response to the driving force of the vehicle.

* * * * *